(12) United States Patent
Färber et al.

(10) Patent No.: US 6,320,854 B1
(45) Date of Patent: Nov. 20, 2001

(54) METHOD AND RADIO COMMUNICATIONS SYSTEM FOR ALLOCATING A RADIO CHANNEL

(75) Inventors: Michael Färber, Wolfrathshausen; Martin Haardt, München; Anja Klein, Berlin; Meik Kottkamp; Werner Mohr, both of München; Jürgen Schindler, Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/677,412

(22) Filed: Oct. 2, 2000

Related U.S. Application Data

(63) Continuation of application No. PCT/DE99/00903, filed on Mar. 25, 1999.

(30) Foreign Application Priority Data

Mar. 30, 1998 (DE) .............................................. 198 14 123

(51) Int. Cl.⁷ ...................................................... H04Q 7/38
(52) U.S. Cl. ...................... 370/328; 331/332; 331/341; 331/337; 331/347
(58) Field of Search .................................. 370/276, 280, 370/294, 328, 329, 330, 331, 332, 333, 335, 337, 341, 342, 347, 348, 431, 441, 442, 468; 455/436–444, 450–452

(56) References Cited

U.S. PATENT DOCUMENTS 5,483,537 * 1/1996 Dupuy ................................... 370/337
6,023,477 * 2/2000 Dent ..................................... 370/509
6,157,842 * 12/2000 Karlsson et al. ..................... 455/456

* cited by examiner

Primary Examiner—Ajit Patel
(74) Attorney, Agent, or Firm—Herbert L. Lerner; Laurence A. Greenberg; Werner H. Stemer

(57) ABSTRACT

A method for allocating radio channels in a radio communications system having timeslots includes the steps of allocating the radio channel for the downlink direction to a mobile station as a function of a channel allocation pattern which indicates the transmission power levels for the timeslots. The mobile station corrects the allocation of the radio channel as a function of an interference pattern which indicates the interference power levels in the timeslots. The allocation process results in the transmission power level being distributed as uniformly as possible between the timeslots which are provided for a connection from the radio station in the downlink direction, wherein the allocation process is a function of the occupancy of the timeslots in accordance with the channel allocation pattern. The ability of correcting the allocated timeslot under the control of the mobile station allows to avoid a disadvantageous soft handover, even with a frequency repetition interval equal to unity which is critical with respect to interference.

12 Claims, 2 Drawing Sheets

METHOD AND RADIO COMMUNICATIONS SYSTEM FOR ALLOCATING A RADIO CHANNEL

CROSS-REFERENCE TO RELATED APPLICATION

This application is a continuation of copending International Application No. PCT/DE99/00903, filed Mar. 25, 1999, which designated the United States.

BACKGROUND OF THE INVENTION

Field of the Invention

The invention relates to a method for allocating a radio channel in a radio communications system. The radio communications system uses radio channels, which are in each case formed by at least one timeslot for transmitting information. The invention further relates to a corresponding radio communications system.

The allocation of radio channels to mobile stations in a radio communications system is normally carried out by radio stations which supply radio resources to the mobile stations or radio subscribers in their associated radio cells. The information is transmitted, via a radio interface, on the allocated radio channel, which is in each case formed by at least one timeslot. Channel allocation problems occur whenever interference occurs among the mobile stations and/or the radio stations, or between a mobile station and a radio station. Particularly in the case of radio communications systems having a frequency repetition interval (reuse cluster) equal to unity, the high interference level means that a soft handover, that is to say connection relaying, is required, in which the mobile stations or radio subscribers at cell boundaries must be supplied with radio resources simultaneously from at least two radio stations. This results in radio stations being networked with one another and results in a considerable additional signaling complexity. Furthermore, the overall capacity of the radio communications system is reduced by subscribers or mobile stations who or which remain in such a soft-handover area.

Published European Patent Application EP 0 411 878 A2 discloses a configuration for managing the power control for radio channels in a radio communications system having a number of base stations and mobile stations. In this case, the radio channels are each allocated an individual transmission/reception power level as a function of the prevailing transmission conditions.

Published British Patent Application GB 2 288 517 A discloses a radio communications system, in which the interference levels of the radio channels are monitored, and are compared with a reference level. A new channel is then chosen if this channel has a level which is lower than the reference level.

A method for a dynamic allocation of transmission channels under different conditions in a communications system is described in the article "Distributed Measurement-based Dynamic Channel Assignment for Personal Communications", IEEE, volume 2, No. CONF.45, Jul. 25, 1995. An allocation algorithm is proposed, which operates on the principle of a least possible interference.

SUMMARY OF THE INVENTION

It is accordingly an object of the invention to provide a method and a radio communications system for allocating a radio channel which overcome the disadvantages of the heretofore-known methods and systems of this general type and which increase the efficiency of the channel allocation and avoid the disadvantages of a soft handover.

With the foregoing and other objects in view there is provided, in accordance with the invention, a method for allocating a radio channel in a radio communications system, the method includes the steps of:

providing radio channels for a transmission of information, the radio channels being formed by at least a respective one of a plurality of timeslots;

performing a channel allocation by allocating, with a radio station, a given one of the radio channels for a downlink direction to a mobile station as a function of a channel allocation pattern, the channel allocation pattern indicating transmission power levels for the plurality of timeslots; and correcting, with the mobile station, the channel allocation as a function of an interference pattern indicating interference power levels in the plurality of timeslots.

In other words, based on a channel allocation in a radio communications system with timeslots, the invention provides that a radio station allocates the radio channel for the downlink direction to a mobile station as a function of a channel allocation pattern which indicates the transmission power levels for the timeslots, and that the mobile station corrects the allocation of the radio channel, controlled by the mobile station, as a function of an interference pattern which indicates the interference power levels in the timeslots.

The allocation process results in the transmission power level being distributed as uniformly as possible between the timeslots which are provided for the connection from the radio station in the downlink direction, as a function of the occupancy of the timeslots in accordance with the channel allocation pattern. The combination with the possibility of correcting the allocated timeslot—to a timeslot with a lower interference power level on the basis of the interference pattern—under the control of the mobile station allows to avoid a disadvantageous soft handover, even with a frequency repetition interval (cluster reuse) equal to unity, which is critical for interference. The mobile station preferably uses a rapid MAHO method (Mobile Assisted Handover) for correction.

According to another mode of the invention, in the situation where the interference pattern at the mobile station has a high interference power level for the timeslot of the allocated radio channel, the mobile station initiates a switching from the allocated timeslot to another timeslot with a lower interference power level.

In accordance with another mode of the invention, the mobile station initiates a switching from a given one of the timeslots assigned to a given one of the radio channels to another one of the timeslots having a lower interference power level than the given one of the timeslots, if the interference pattern at the mobile station has a high interference power level for the given one of the timeslots.

In accordance with yet another mode of the invention, the interference pattern is formed by superimposing channel allocation patterns of a plurality of radio stations, in particular of adjacent radio stations.

In accordance with a further mode of the invention, the transmit information is distinguished on the basis of a subscriber-specific fine structure in one of the timeslots for a simultaneous transmission of the information to a plurality of mobile stations.

In accordance with another mode of the invention, spread codes in accordance with a CDMA (Code Division Multiple Access) method are used for the subscriber-specific fine structure.

In accordance with yet another mode of the invention, spatial incidence directions of training sequences in accordance with an SDMA (Spatial Division Multiple Access) method are used for the subscriber-specific fine structure.

In accordance with a further mode of the invention, the timeslots are organized in accordance with a TDMA access method or a TDD (Time Division Duplex) access method and the radio channels are formed from the timeslots of the TDMA access method or the timeslots of the TDD access method.

In accordance with another mode of the invention, the radio station allocates one of the radio channels for an uplink direction to the mobile station as a function of the interference pattern generated from received timeslots.

In accordance with yet another mode of the invention, the radio station selects one of the radio channels currently having a lowest interference power level for a connection to a further mobile station.

A combination of the method based on a timeslot structure—for example a TDMA or TDD method—with a subscriber-specific fine structure in order to distinguish information transmission in one and the same timeslot—for example for the CDMA (Code Division Multiple Access) method or the SDMA (Space Division Multiple Access) method—is particularly advantageous.

With the objects of the invention in view there is also provided, a radio communications system for allocating a radio channel, including:

a mobile station; and a radio station operatively connected to the mobile station, the mobile station and the radio station being configured for use with radio channels each formed by at least one of a plurality of timeslots for transmitting information;

the radio station providing an allocation of one of the radio channels for a downlink direction to the mobile station, the radio station allocating the one of the radio channels as a function of a channel allocation pattern indicating transmission power levels for the plurality of timeslots; and the mobile station correcting the allocation of the one of the radio channels as a function of an interference pattern indicating interference power levels in the plurality of the timeslots.

Other features which are considered as characteristic for the invention are set forth in the appended claims.

Although the invention is illustrated and described herein as embodied in a method and radio communications system for allocation of a radio channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
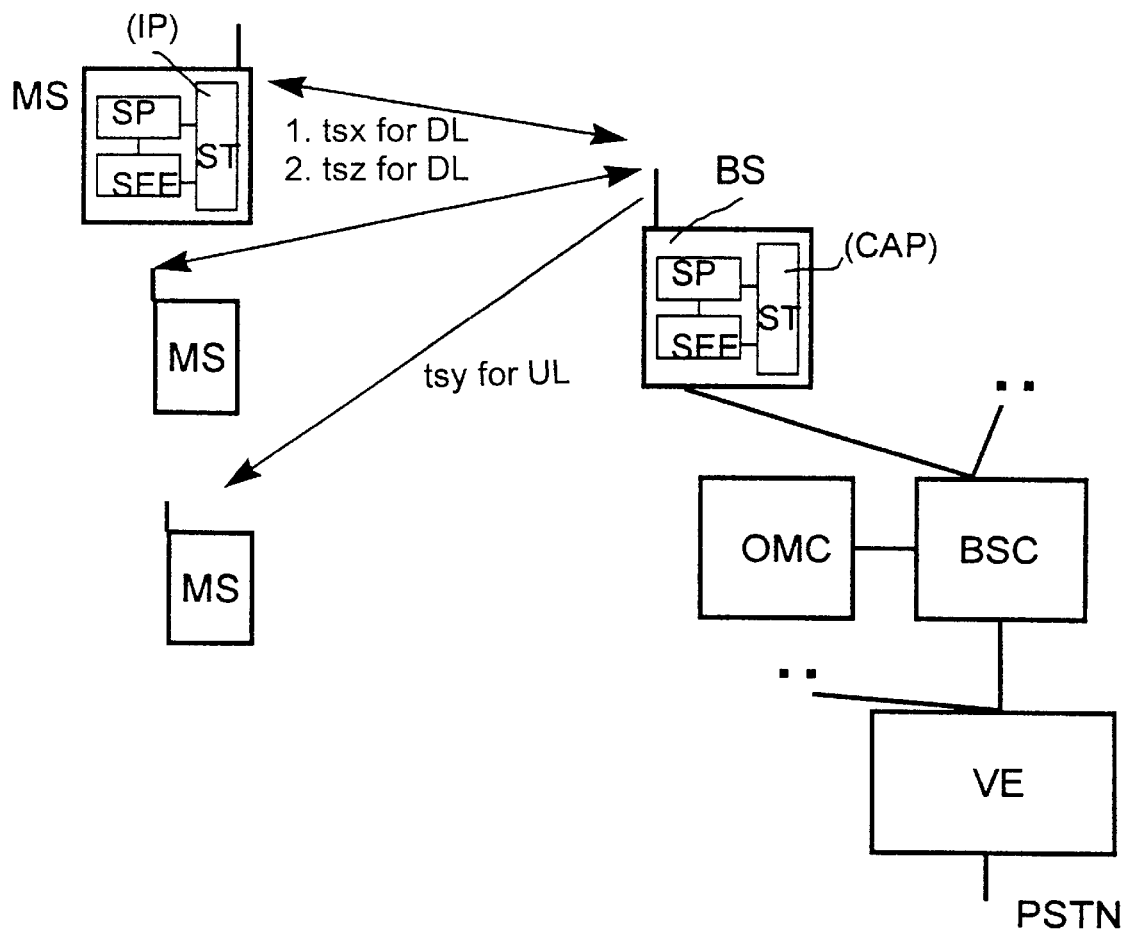
FIG. 1 is a block diagram illustrating a radio communications system.

Referring now to the figures of the drawings in detail and first, particularly, to FIG. 1 thereof, there is shown a radio communications system which has at least one switching device VE which is networked with other switching devices or provides the network junction to a fixed network PSTN. The switching device VE is connected to at least one radio section controller BSC, which is in turn connected to a radio station BS. Between the radio station BS and the mobile stations MS there is a radio interface via which subscriber signals for, for example, three connections are transmitted.

The radio communications system furthermore has an associated operation and maintenance center OMC, which is connected to the switching center VE and/or to the radio controller BSC, and is used for monitoring the power parameters of the radio communications system, and for maintenance and fault monitoring. The operation and maintenance center can also be provided only for component elements of the radio communications system, for example for the radio section system or radio subsystem.

A radio channel which is formed for the respective connection by using one or more timeslots, as in the TDMA (Time Division Multiple Access) method or in the TDD (Time Division Duplex) method, is considered for the radio interface between the radio station BS and the mobile stations MS. Furthermore, the radio channel is also characterized by a frequency. In order to separate a number of subscriber signals, the timeslot preferably includes a number of CDMA spread codes or training sequences with different incidence directions, which are received by an antenna array at the radio station BS, the antenna array having a signal processing provided downstream thereof. However, the method described in the following text can also be used when some other form of subscriber separation is used. For a separation of subscribers through the use of their respective spread code, the subscriber signals are modulated with the subscriber code at the transmission end, for the downlink direction for example in the radio station BS, and are detected at the receiving end on the basis of the subscriber code that is present there, using the JD-CDMA method (Joint Detection Code Division Multiple Access). Each radio station BS and each mobile station MS normally has a transmitting/receiving device SEE, a memory device SP and a control device ST, which carry out the tasks and functions to implement the invention. It is assumed that the radio communications system has a clustering with a frequency repetition interval equal to unity.

The radio station BS knows the present radio channel allocation for the downlink direction DL. In the timeslot-controlled system, this corresponds to the distribution of the transmission power levels between the existing timeslots (see FIG. 2) and, if appropriate, spread codes. The radio station BS or its control device ST thus has knowledge of its present channel allocation pattern CAP, in which the transmission power levels are indicated for the timeslots. The radio station BS allocates a radio channel for the downlink direction, which is formed for example by the timeslot tsx in FIG. 2, for the connection to the mobile station MS as a function of the radio station's channel allocation pattern CAP. A timeslot is preferably chosen in which the occupancy is low, so that the transmitted power levels are distributed as uniformly as possible between all the available timeslots. After the allocation of the radio channel, which is signaled to the mobile station MS via the radio interface, the mobile station MS or its control device ST checks its interference situation using an interference pattern IP. The interference pattern indicates the interference power levels in the individual timeslots, as is illustrated in FIG. 3.

Figure 3:
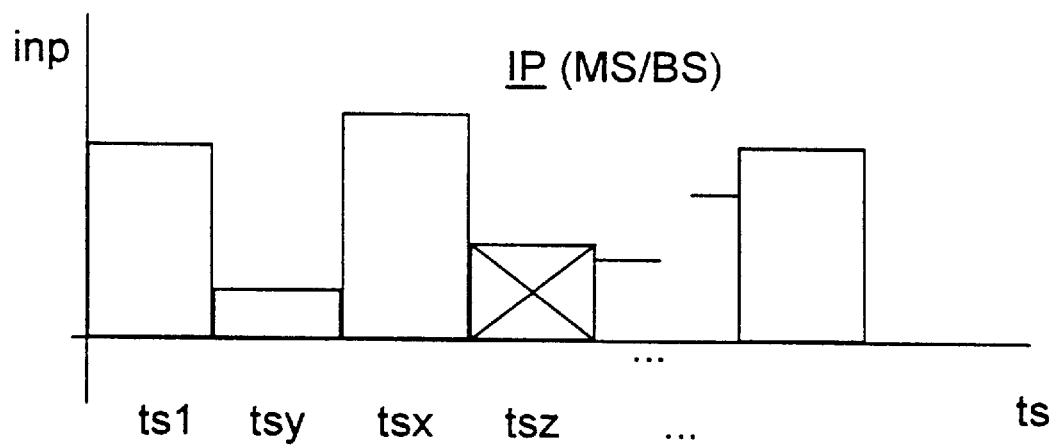
FIG. 3 is a graph schematically illustrating the distribution of the interference power levels according to an interference pattern at the mobile station.

If, as in the present case, the radio station BS finds from the interference pattern IP that the interference power level in the allocated radio channel—see the timeslot tsx in FIG. 3—is high and thus critical, it initiates a switching to another timeslot, for example tsz, with a lower interference power level in the interference pattern IP. A rapid "hard handover" MAHO (Mobile Assisted Handover) is preferably carried out by the mobile station or the control device ST to the new timeslot, thus correcting the timeslot tsx, allocated by the radio station BS, for the downlink direction. The correction carried out by the mobile station MS is signaled via the radio interface to the radio station BS.

The interference pattern IP at the mobile station MS is obtained by superimposing the channel allocation patterns CAP of a number of preferably adjacent radio stations BS. The channel allocation pattern CAP at the radio station BS is thus normally different from the interference pattern IP at the mobile station MS. The radio station BS preferably also assigns the radio channel to the uplink direction UL, as a function of the interference pattern IP of the received timeslots in the mobile station MS. In the present example, the radio station BS chooses the radio channel formed by the timeslot tsy, whose interference power level is the lowest at that time, for the connection to a new mobile station MS, and reports this channel to the respective mobile station MS.

The advantage of the channel allocation method according to the invention is the combination of an allocation of the radio channel by the radio station BS on the basis of the present occupancy with regard to the transmission power levels with a rapid intrazell handover, controlled by the mobile station, to a timeslot with a low interference power level on the basis of the current interference pattern.

Figure 2:
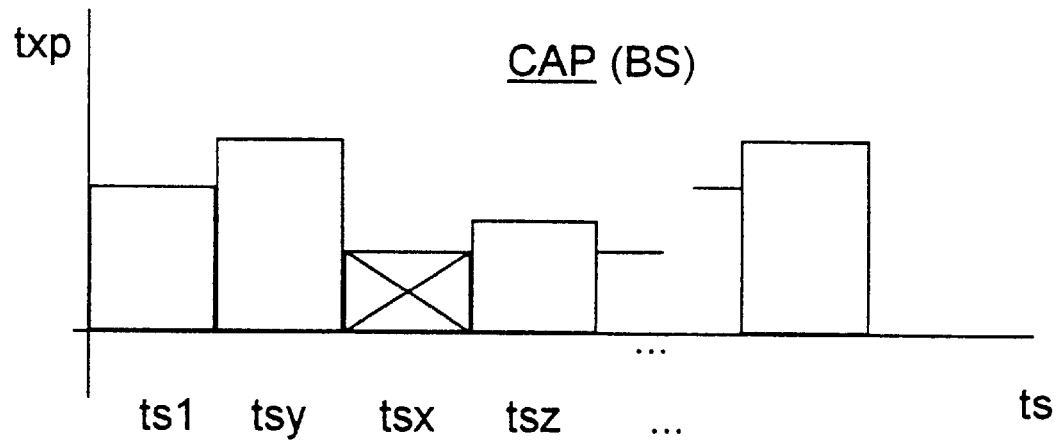
FIG. 2 is a graph schematically illustrating the distribution of the transmission power levels according to a channel allocation pattern at the radio station.

FIG. 2 and FIG. 3 show examples for the patterns CAP, IP at the radio station BS and mobile station MS. For simplicity, the interference pattern IP at the radio station BS for allocation of the radio channel—timeslot tsy—for the uplink direction is identical to the interference pattern IP at the mobile station MS for correction of the allocated radio channel—from the timeslot tsx to the timeslot tsz. Generally they are however different. The channel allocation pattern CAP is based on the distribution of the transmission power level txp with different power levels between the timeslots ts1, tsy, tsx, tsz . . . , while the interference pattern IP allocates each of the timeslots ts1, tsy, tsx, tsz . . . an interference power level inp with different power levels.

We claim:

1. A method for allocating a radio channel in a radio communications system, the method which comprises:
providing radio channels for a transmission of information, the radio channels being formed by at least a respective one of a plurality of timeslots;
performing a channel allocation by allocating, with a radio station, a given one of the radio channels for a downlink direction to a mobile station as a function of a channel allocation pattern, the channel allocation pattern indicating transmission power levels for the plurality of timeslots; and
correcting, with the mobile station, the channel allocation as a function of an interference pattern indicating interference power levels in the plurality of timeslots.

2. The method according to claim 1, which comprises initiating, with the mobile station, a switching from a given one of the timeslots assigned to the given one of the radio channels to another one of the timeslots having a lower interference power level than the given one of the timeslots, if the interference pattern at the mobile station exceeds a given interference power level for the given one of the timeslots.

3. The method according to claim 1, which comprises forming the interference pattern by superimposing channel allocation patterns of a plurality of radio stations.

4. The method according to claim 1, which comprises forming the interference pattern by superimposing channel allocation patterns of adjacent radio stations.

5. The method according to claim 1, which comprises distinguishing the information on the basis of a subscriber-specific fine structure in one of the timeslots for a simultaneous transmission of the information to a plurality of mobile stations.

6. The method according to claim 5, which comprises using spread codes in accordance with a CDMA method for the subscriber-specific fine structure.

7. The method according to claim 5, which comprises using spatial incidence directions of training sequences in accordance with an SDMA method for the subscriber-specific fine structure.

8. The method according to claim 1, which comprises organizing the timeslots in accordance with a TDMA access method and forming the radio channels from the timeslots of the TDMA access method.

9. The method according to claim 1, which comprises organizing the timeslots in accordance with a TDD access method and forming the radio channels from the timeslots of the TDD access method.

10. The method according to claim 1, which comprises allocating, with the radio station, one of the radio channels for an uplink direction to the mobile station as a function of the interference pattern generated from received ones of the timeslots.

11. The method according to claim 1, which comprises selecting, with the radio station, one of the radio channels having a currently lowest interference power level for a connection to a further mobile station.

12. A radio communications system for allocating a radio channel, comprising:
a mobile station; and
a radio station operatively connected to said mobile station, said mobile station and said radio station being configured for use with radio channels each formed by at least one of a plurality of timeslots for transmitting information;
said radio station providing an allocation of one of the radio channels for a downlink direction to said mobile station, said radio station allocating the one of the radio channels as a function of a channel allocation pattern indicating transmission power levels for the plurality of timeslots; and
said mobile station correcting the allocation of the one of the radio channels as a function of an interference pattern indicating interference power levels in the plurality of the timeslots.

* * * * *